Dec. 17, 1940.                J. E. ROLLO                 2,225,319
                        EXTENSIBLE VEHICLE BODY
              Filed Jan. 5, 1939          3 Sheets-Sheet 1
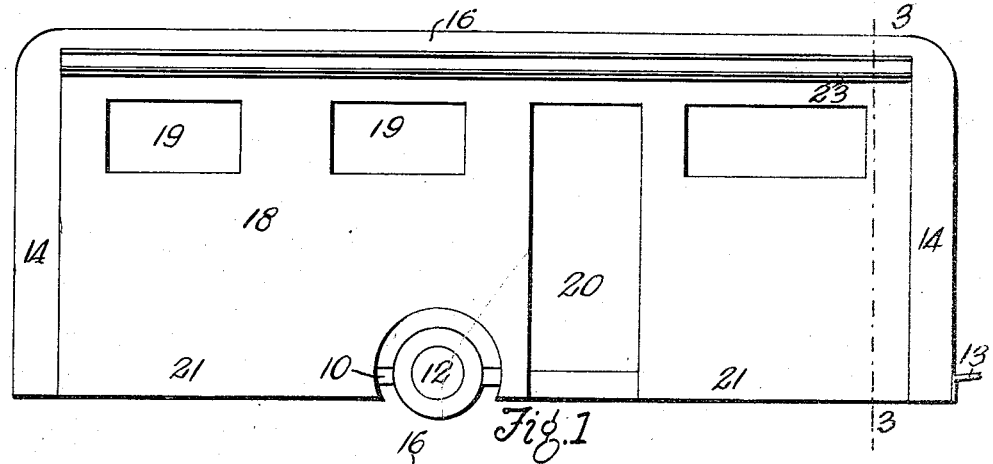
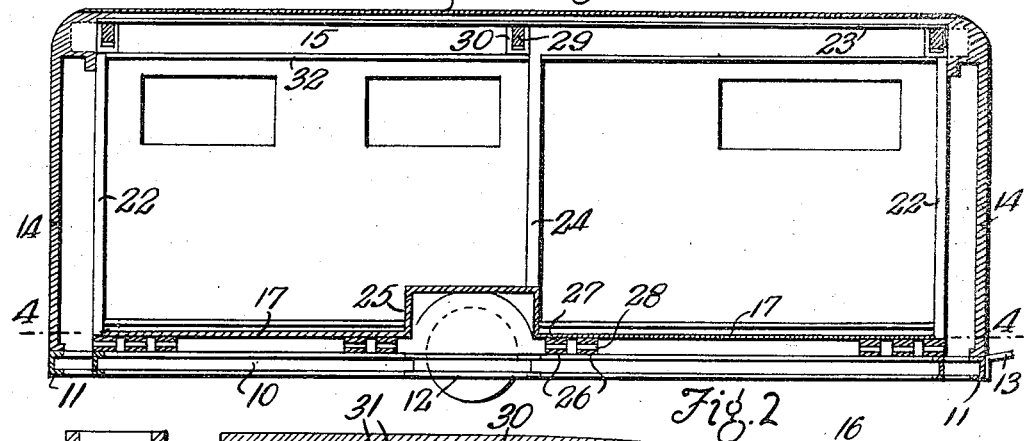
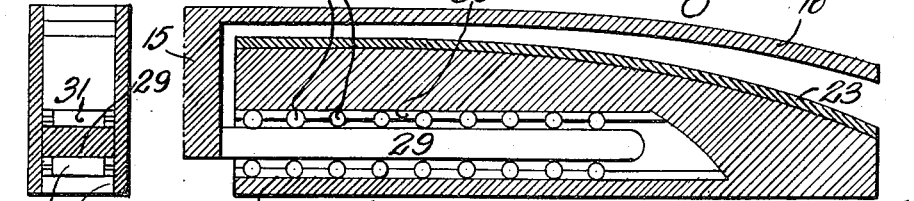
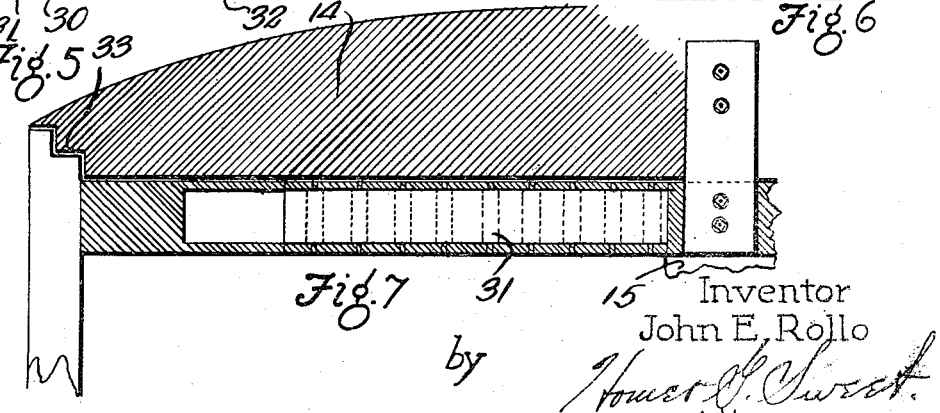
Inventor
John E. Rollo
by Homer J. Sweet
Attorney

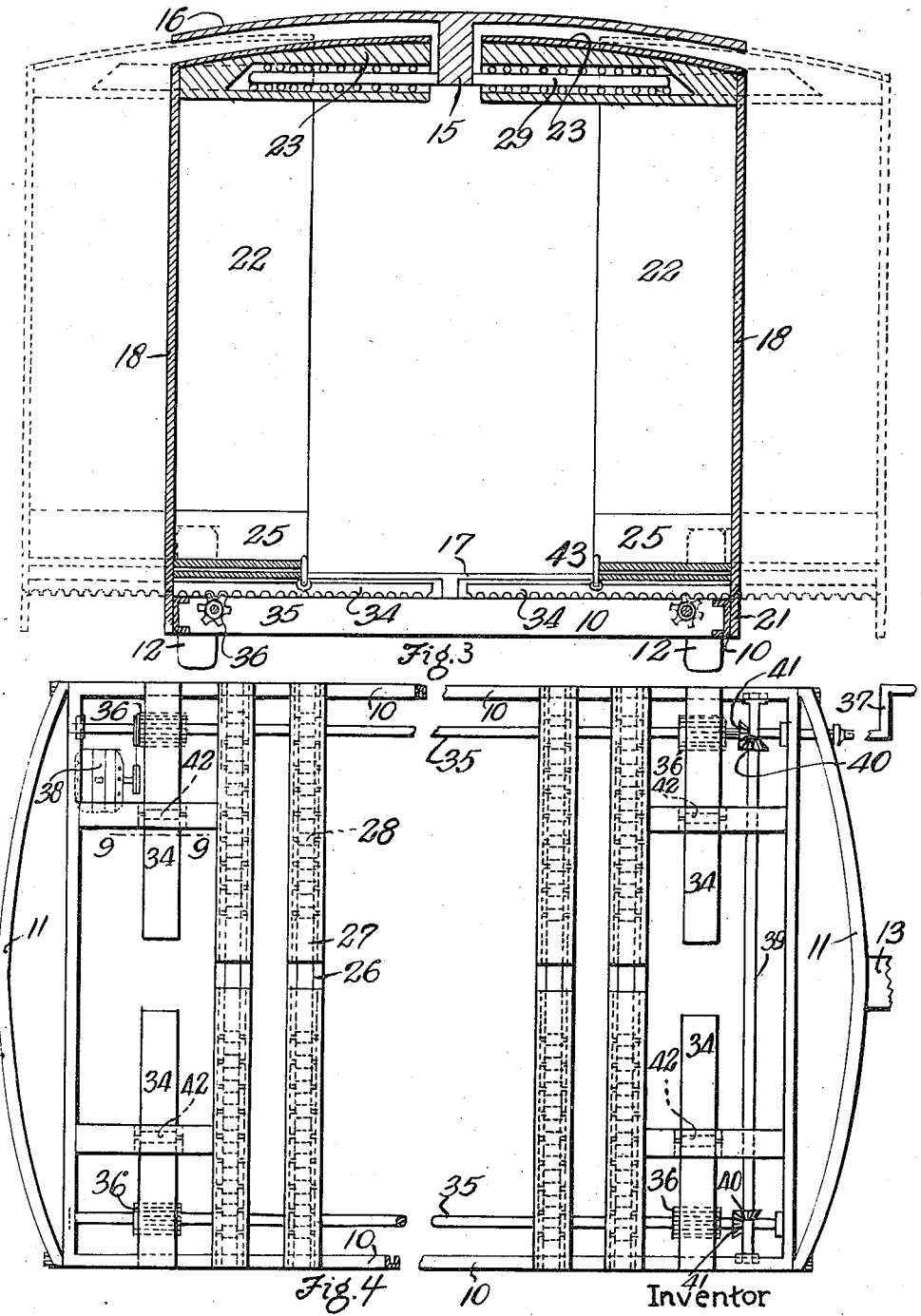

Dec. 17, 1940.  J. E. ROLLO  2,225,319
EXTENSIBLE VEHICLE BODY
Filed Jan. 5, 1939   3 Sheets-Sheet 3
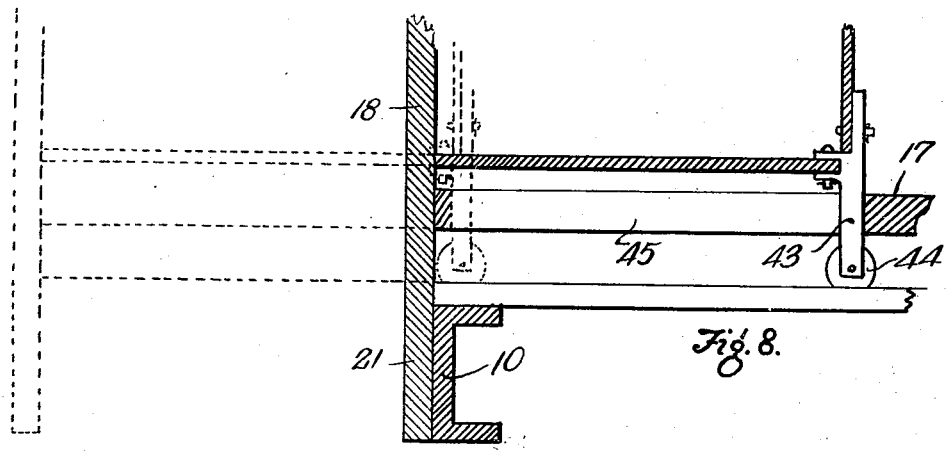
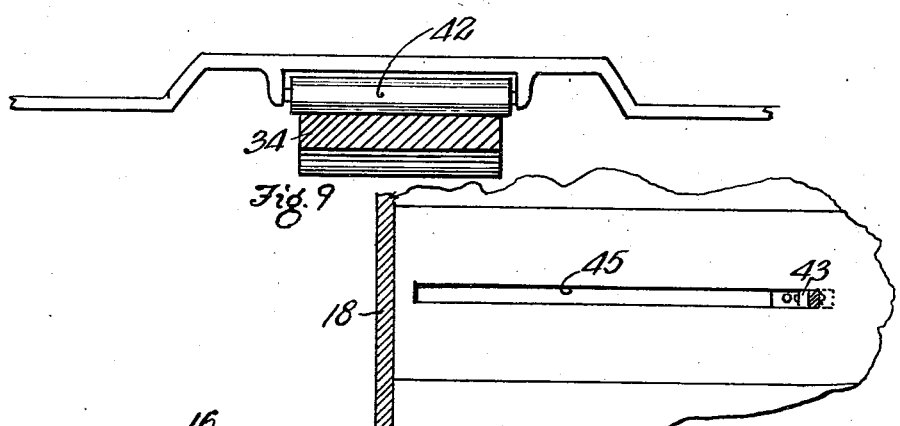
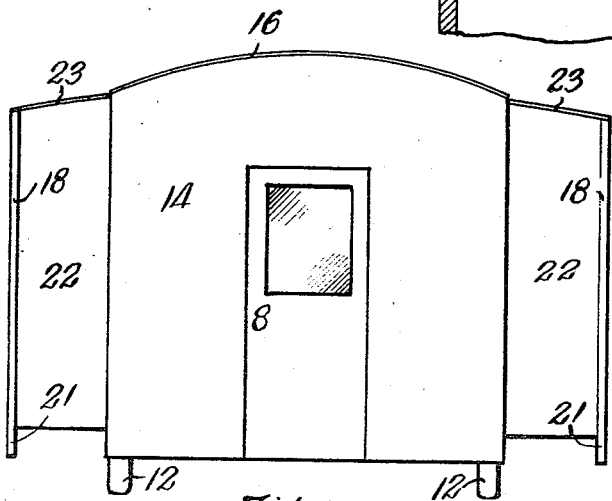
Inventor
John E. Rollo
by
Attorney Patented Dec. 17, 1940

2,225,319

UNITED STATES PATENT OFFICE 2,225,319

EXTENSIBLE VEHICLE BODY

John E. Rollo, Denver, Colo.

Application January 5, 1939, Serial No. 249,437

4 Claims. (Cl. 296—23)

This invention relates to vehicles and transport units designed for land, water, or air travel, and more particularly to the body portions or enclosures of such units, and has as an object to provide an improved arrangement of elements constituting such a body or enclosure adapted for convenient selective variation in size and consequent capacity.

A further object of the invention is to provide an improved laterally-extensible vehicle body enclosure.

A further object of the invention is to provide an improved combination of movable side closure assemblies with a rigid vehicle body frame to constitute a laterally-extensible body enclosure.

A further object of the invention is to provide improved means for operatively positioning, guiding, and actuating side closure assemblies in selectively extensible relation with a rigid body enclosure frame to form a vehicle body susceptible of variation in size and capacity.

A further object of the invention is to provide an improved, extensible, vehicle body particularly adapted for use on trailer units of road type.

A further object of the invention is to provide an improved vehicle body including removable and replaceable side closure assemblies interchangeable in operative relation with the body frame to selectively vary the specific character and interior arrangement of the body enclosure.

A further object of the invention is to provide an improved, laterally-extensible vehicle body enclosure susceptible of retraction to present a minimum width during transport and extensible to maximum size and interior capacity when at rest; which is weathertight in any and all of its adjusted positions; which is susceptible of adjustment by hand or power means; which is relatively simple and inexpensive of manufacture; which is adaptable for use with land, water, and air transport units; and which is of practical advantage throughout a wide range of specific uses and adaptations.

My invention consists in the construction, arrangement, and combination of elements hereinafter set forth, pointed out in my claims, and illustrated by the accompanying drawings, in which—

Figure 1 is a side elevation of an embodiment of the invention as mounted on and adapted for use with an automobile trailer unit. Figure 2 is a vertical section taken on substantially the longitudinal median line of Figure 1. Figure 3 is a transverse section, on an enlarged scale, taken on the indicated line 3—3 of Figure 1. Figure 4 is a horizontal section, on an enlarged scale, taken substantially on the line 4—4 of Figure 2, a central portion of the view being omitted to conserve space. Figure 5 is a fragmentary, detail section, on an enlarged scale, of side closure assembly guide and support means employed in the embodiment illustrated. Figure 6 is a fragmentary, detail section of the means illustrated in and at right angles to the showing of Figure 5. Figure 7 is a fragmentary, detail section, on a horizontal plane, illustrating the cooperative arrangement of adjacent portions of frame and side closure assembly elements. Figure 8 is a fragmentary, detail section, on an enlarged scale, through cooperating slidable side closure panel and fixed floor portions employed in the improved unit. Figure 9 is a fragmentary, detail view, on an enlarged scale, taken on the indicated line 9—9 of Figure 4. Figure 10 is a plan view of the construction shown in Figure 8, certain elements of the latter figure being omitted to better illustrate otherwise concealed construction. Figure 11 is an end view of the improved unit as laterally extended.

Practical considerations, as well as certain statutory requirements, restrict and limit the effective width of transport unit bodies, particularly those designed to traverse highways, in a manner which limits the availability of such bodies for other uses when not in transit. This condition particularly affects truck bodies and trailer units which are designed to be immobilized for periods of time and used as dwellings, shops, and the like, and it is the primary purpose of this invention to provide a vehicle body construction such as will comply with the practical and other considerations governing its transit and yet permit of lateral extension, when desired, to adapt said body for convenient and comfortable employment as a dwelling, office, workshop, and the like. Since the automobile trailer unit has the advantage of freeing towing vehicle for other employment when the trailer is immobilized, the invention is illustrated in association with such a unit, though it is to be understood that the principles of the invention may be similarly adapted for mounting on and employment with other specific types of vehicles.

In the construction of the improvement as shown, the numeral 10 designates a conventional, substantially rectangular, rigid frame, of conventional type, on and about which the elements comprising the complete vehicle unit are supported and arranged. The frame 10 is preferably fabricated from suitable metallic structural elements, as is common practice, and, in the embodiment shown, is preferably formed with arcuate end members 11 extending oppositely from and across the narrower dimension of the frame assembly. Suitable wheels 12 are journaled for rotation in vertical planes on opposite sides of the frame 10 in any desired manner to suitably support said frame above and for travel along a supporting surface, such as a roadway, the specific mounting and arrangement of the wheels 12 relative to the frame 10 being immaterial to the instant invention, though it is preferred to mount said wheels for rotation about separate spindles suitably associated with opposite sides of the frame 10 so as to permit mounting of said frame in a plane lower than would be possible when an axle member interconnecting said wheels below said frame is employed. The wheels 12 are aligned on an axis of rotation which is positioned perpendicular to the longitudinal median line of the frame 10 and preferably more nearly one end of said frame than the other, and a hitch 13 is fixed to and projects longitudinally from one end of said frame to connect the latter, at times, with a towing vehicle.

The improved body enclosure has a rigid frame portion which is permanently secured to and carried by the frame 10, said frame portion consisting of suitably fabricated end sections 14 fixed to, extending entirely across the width of, and rising vertically from the opposite end portions of the frame 10, and a beam 15, or structurally equivalent element, spaced above the longitudinal median line of the frame 10 in bridging and rigidly interconnecting relation between midportions of the upper ends of the end sections 14. The beam 15 supports a rigid roof structure 16 which curves or is inclined laterally of the unit on opposite sides of said beam to marginal coincidence with side margins of the end sections 14, and the inner edges of said end section side margins are straight and vertically disposed to cooperate with outer margins of the roof 16 and therewith define rectangular openings above and substantially coextensive in length with side members of the frame 10. In spaced relation with and immediately above the frame 10, a suitable floor 17 is secured to and in complete covering relation with the area of said frame between the end sections 14, said floor being of any specific construction and fabrication suitable to its cooperation with other elements of the assembly as hereinafter set forth.

The side closure assemblies completing the vehicle body are identical, relatively-movable units disposed on opposite sides of and in supported and guided relation with the body frame above described. Each of said side closure units includes a vertical wall or panel 18 which is rigidly fabricated of suitable material in a size to substantially fill the side rectangular opening between the end sections 14, frame 10, and lower margin of the roof 16, a small clearance being provided between the upper margin of said panel and the lower margin of said roof, for reasons which will later appear. The panel 18 may be provided with windows 19 and a door 20, in such specific arrangement as may be desired in a given construction, and said panel may be formed with a downward extension or skirt 21 adapted to depend across and close against the outer margin of the frame 10. The panel 18 rigidly connects adjacent each of its ends with a perpendicularly-related, inwardly-extending panel 22 which is thus disposed in a vertical plane transversely of the vehicle body immediately within and closely adjacent the inner wall of the corresponding end section 14, said panels 22 having a width such as will cooperate with the inner walls of the end sections 14 to maintain an end closure for the body assembly when the side closure units are at the maximum limit of their lateral extension. A roof portion 23 is fixed at its outer margin to the upper margin of each panel 18 and is curved or inclined upwardly and inwardly from such connection in bridging relation between the panels 22 and in suitably spaced relation below the fixed roof 16, the curvature and disposition of the roof portion 23 being such as will position said roof portion as a weathertight extension of the roof 16 when the side closure unit is extended laterally of the vehicle body. The roof portion 23 preferably extends inwardly toward the beam 15 a distance considerably in excess of the lateral travel available to the side enclosure, so that when the latter is laterally extended, the inner extension of the roof portion 23 is lapped under the fixed roof 16 sufficiently to form a weathertight joint through which leakage is improbable. The side enclosures constructed as above described may be divided into sections by means of suitably-disposed partitions 24, and may carry such fixtures and facilities as may be desired to complete the interior arrangement of the vehicle body, it being particularly convenient to dispose beds, stoves, work-benches, cupboards, and the like, in fixed relation with the side enclosures so that such facilities move with the side enclosures as the latter are extended laterally of the body. Since the wheels 12 normally extend above the frame 10, suitable boxings 25 are provided in fixed, inwardly-extending relation with the side panels 18 to provide recesses wherein said wheels may be received and accommodated as the side enclosure units are extended laterally of the frame, said boxings 25 extending inwardly a distance sufficient to clear said wheels when the side enclosure units are at the outer limit of their lateral travel.

The side enclosure units may be variously supported, guided, and actuated for retraction and extension laterally of the rigid body frame, typical means suitable to such purpose being illustrated in the drawings and hereinafter described. As shown, a plurality of track members 26 may be rigidly secured to and in transverse relation with the frame 10 adjacent the upper margin of the latter, in such number and specific arrangement as may be suitable to the size and weight of moveable members to be carried thereby, the construction illustrated contemplating a pair of such track members 26 adjacent each end of the frame and a similar pair of said track members traversing midportions of the frame on opposite sides of the wheel positions. The track members 26 are disposed to underlie and register with complementary bearing arms 27 which are fixed at their outer ends to the panels 18 or frame members of the side enclosure units and extend inwardly therefrom in superposed alignment above the members 26, anti-friction devices, such as rollers 28, preferably being interposed between the members 26 and end arms 27 to minimize friction therebetween. This arrangement serves to slidably support the weight of the side enclosure units from the frame 10, the bearing member, arm, and anti-friction assemblies being disposed intermediate the frame 10 and the fixed floor 17. Upper portions of the side enclosure units are likewise supported and guided to maintain the side panels 18 in vertical position during travel of the side enclosure units, and means suitable to such purpose are illustrated as comprising oppositely-extending, horizontal, bracket arms 29 fixed to and extending laterally of the body enclosure from a lower portion of the beam 15 to engage beneath the roof portions 23 of the side enclosure units. The arms 29 may be provided in such number and specific arrangement as may appear most expedient and desirable in a given body construction, and said arms are arranged to engage within suitable wells or recesses 30 formed for such purpose in upper portions of the side closure units beneath the roof portion 23, anti-friction devices 31 preferably being interposed between upper and lower surfaces of the arms 29 and adjacent surfaces of the recesses 30 to minimize friction therebetween. The antifriction devices 31 are preferably mounted for travel with the side enclosure units, and the latter are preferably provided with ceiling portions 32 extending inwardly in fixed relation from their panels 18 to underlie, house, and conceal the recesses 30 and elements associated therewith. The arrangement shown and described provides side enclosure units which are slidably mounted and guided for closing cooperation with opposite sides of the rigid body frame, end portions of said slidable units cooperating with the fixed end portions of the body frame and roof portions of the slidable units cooperating with the fixed roof of the body frame to maintain a weathertight enclosure irrespective of the relative position of said slidable units within their operative range. Weather strips and like sealing means may of course be associated with and disposed between relatively movable elements of the complete assembly, as is common practice, and meeting corners of the panels 18 and fixed end sections 14 are preferably stepped, as shown at 33 in Figure 7, to provide more rigid interengagement and enhanced sealing therebetween when the slidable units are in retracted position.

Actuating mechanism operable to extend and retract the side enclosure units, either independently or simultaneously, may be provided in such specific construction and arrangement as may be best adapted to a given embodiment of the invention, typical means for such purpose being illustrated and hereinafter described. In the arrangement shown, each of the side enclosure units carries a rack bar 34 in fixed, inwardly-extending relation adjacent each of its ends, said rack bars being disposed transversely and adjacent the top plane of the frame 10 beneath the fixed floor 17. Parallel with and inwardly of each long side margin of the frame 10, a shaft 35 is disposed for rotation in suitable bearings carried by said frame and in underlying relation with the rack bars 34, pinions 36 being fixed to said shafts for meshing engagement with said rack bars, so that rotation of either shaft 35 acts through its pinions 36 and the rack bars 34 engaged therebetween to slide the side enclosure unit carrying said rack bars in a direction corresponding with the direction of shaft rotation. When it is desired to actuate the enclosure units independently, the shafts 35 may be extended outwardly through one end of the frame 10 and arranged for engagement at times by a hand crank 37 whereby said shafts may be rotated, or, if power actuation is desired, a prime mover 38, such as an electric motor, compressed air, engine, or the like may be mounted on the frame 10 adjacent each shaft 35 and operatively connected with and to impart rotation to its adjacent shaft as the prime mover is selectively actuated. In general, it is more desirable to extend and retract the side enclosure units simultaneously, for which purpose the shafts 35 are interconnected for simultaneous rotation in opposite directions, one such arrangement being illustrated as comprising a shaft 39 mounted for rotation transversely of the frame 10 and provided with oppositely disposed bevel gears 40 meshing with bevel gears 41 fixed to the shafts 35, so that rotation of either shaft 35, by means of the hand crank 37 or prime mover 38, acts through the bevel gears and shaft 39 to rotate the other shaft 35 simultaneously and in an opposite direction. Suitable means, such as a fixed roller 42 bearing against the upper surface of each rack bar 34, may be provided to maintain said rack bars in meshed engagement with their pinions 36.

By providing suitable clearance between the side enclosure unit roof portions 23 and the fixed roof 16, said side enclosure units are rendered freely removable and replaceable relative to the body frame, thereby enhancing the utility of the invention in that side enclosure units equipped with facilities for various purposes and in various arrangements may be interchangeably associated with the transport unit, it thus being convenient to adapt the vehicle, in one instance, for dwelling purposes, and in another instance as a workshop equipped with the necessary tools and benches, simply by interchanging suitably-equipped side enclosure units. Since it is practically desirable to limit extension of the side enclosure units relative to the body frame except when said units are to be completely removed, stop means are provided to engage with fixed portions of the body frame when the desired limit of extension has been reached, such stop means conveniently taking the form of depending studs 43 removably or adjustably fixed to inner margin portions of the side enclosure units for sliding engagement through and along transverse slots 45 formed in the fixed floor 17, said studs conveniently carrying rollers 44 on their lower ends for bearing engagement against fixed track members on the frame 10. By disengagement of the studs 43 from the side enclosure unit elements, said side enclosure units are freed for removal from the body frame, while engagement of the studs in their fixed relation with ends of the slots 45 serves to adequately limit lateral extension of said side enclosure units.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention—

1. In a vehicle body having a transporting, rigid frame, body enclosure end and floor portions fixedly carried by said frame, a rigid beam fixedly interconnecting upper, central points of said end portions in spaced, parallel relation above and longitudinally of said frame, a roof structure wholly supported by said beam and end portions in covering relation with said floor, enclosure-completing side units slidably associated with said frame in continuing closing cooperation with said enclosure end, roof and floor portions, slidably cooperating guide and positioning means engaging between upper portions of said side units and said beam, and slidably cooperating supporting means engaging between lower portions of said side units and fixed elements of said frame.

2. In a vehicle body having a transportable, rigid frame, body enclosure end and floor portions fixedly carried by said frame, a rigid beam fixedly interconnecting upper, central points of said end portions in spaced, parallel relation above and longitudinally of said frame, a roof structure wholly supported by said beam and end portions in covering relation with said floor, enclosure-completing side units slidably associated with said frame in continuing closing cooperation with said enclosure end, roof and floor portions, a plurality of bracket arms fixed at their inner ends to and extending laterally in spaced relation from opposite sides of said beam beneath and independently of said roof structure, recesses in upper portions of said side units adapted to telescopically receive and slidably cooperate with said bracket arms, whereby said side unit upper portions are guided and positioned, and slidably cooperating supporting means engaging between lower portions of said side units and fixed elements of said frame.

3. In a vehicle body having a transportable, rigid frame, body enclosure end and floor portions fixedly carried by said frame, a rigid beam fixedly interconnecting upper, central points of said end portions in spaced, parallel relation above and longitudinally of said frame, a roof supported by said beam and end portions in covering relation with said floor, and enclosure-completing side units slidably associated with said frame in continuing closing cooperation with said enclosure end, roof and floor portions, guide, support and positioning means engaging between said side units and fixed members of said body enclosure, said means comprising bracket arms fixed to and extending laterally in spaced relation from opposite sides of said beam beneath and independently of said roof, recesses in upper portions of said side units adapted to telescopically receive and slidably cooperate with said bracket arms, track members fixed transversely of said frame beneath said floor, bracket arms fixed to the side unit lower margins and extending inwardly beneath said floor in overlying relation with said track members, and anti-friction devices operatively between said last-named bracket arms and track members.

4. In a vehicle body having a transportable, rigid frame, body enclosure end and floor portions fixedly carried by said frame, a rigid beam fixedly interconnecting upper, central points of said end portions in spaced, parallel relation above and longitudinally of said frame, a roof supported by said beam and end portions in covering relation with said floor, and enclosure-completing side units slidably associated with said frame in continuing closing cooperation with said enclosure end, roof and floor portions, guide, support and positioning means engaging between said side units and fixed members of said body enclosure, said means comprising bracket arms fixed to and extending laterally in spaced relation from opposite sides of said beam, recesses in upper portions of said side units adapted to telescopically receive and slidably cooperate with said bracket arms, track members fixed transversely of said frame beneath said floor, bracket arms fixed to the side unit lower margins and extending inwardly beneath said floor in overlying relation with said track members, anti-friction devices operatively between said last-named bracket arms and said track members, transverse slots in said floor above certain of said track members, stems removably secured to inner lower corners of said side units in position to depend through said slots, and wheels on lower ends of said stems beneath said floor for rolling engagement with the track members underlying said slots.

JOHN E. ROLLO.